United States Patent  [11] 3,624,247

[72] Inventors Kurt Paul Gladney
    Sarnia;
    Hendrick H. J. Deuzeman, Watford,
    Ontario, both of Canada
[21] Appl. No. 20,480
[22] Filed Mar. 26, 1970
[45] Patented Nov. 30, 1971
[73] Assignee Fiberglas Canada Limited
    Toronto, Ontario, Canada
    Continuation of Ser. No. 806,315, Mar. 11,
    1969, abandoned, and a continuation-in-part
    of application Ser. No. 415,457, Dec. 2, 1964,
    now Patent No. 3,432,453. This application
    Mar. 26, 1970, Ser. No. 20,480
    The portion of the term of the patent
    subsequent to Mar. 11, 1986, has been
    disclaimed.

[54] DEIONIZING TREATMENT FOR PHENOLIC
    RESINS USING A SOLUBLE AMMONIUM SALT
    10 Claims, No Drawings

[52] U.S. Cl. .................................................. 260/29.3,
    117/124 E, 117/141, 117/161 L, 117/161 LN,
    210/54, 260/59, 260/60
[51] Int. Cl. ............................................. C08g 37/08,
    C08g 51/24
[50] Field of Search ........................................... 260/59,
    29.3

[56] References Cited
    UNITED STATES PATENTS
3,432,453  3/1969  Gladney et al. ............... 260/29.3

Primary Examiner—Howard E. Schain
Attorney—Stevens, Davis, Miller & Mosher

ABSTRACT: In the formation of a resin solution, the removal of residual calcium catalyst ions is effected by treatment with an alkaline solution of an ammonium salt having an ion which forms an insoluble salt with calcium ion, at a pH of from 5 to 6.5 and subsequently raising the pH to about 7 by the addition of ammonia.

DEIONIZING TREATMENT FOR PHENOLIC RESINS USING A SOLUBLE AMMONIUM SALT

This is a continuation-in-part of application Ser. No. 415,457 filed on the 2nd of Dec., 1964 and issued on the 11th of Mar., 1969 as U.S. Pat. No. 3,432,453, the disclosure of which is incorporated herein by reference. This application is also a continuation of application, Ser. No. 806,315, filed Mar. 11, 1969, and now abandoned.

The present invention relates to the production of calcium hydroxide catalyzed phenolaldehyde resins for bonding together mineral wool fibers, for example, glass fibers in the formation of fibrous insulation material. It is the object of the invention to provide an economical method of removing ions of calcium from an aqueous solution of a phenolaldehyde resin. Typical mol ratios of the resins are, for example, between 1.9 mol of formaldehyde to 1 mol of phenol and 2.8 mols of formaldehyde to 1 mol of phenol.

The removal of calcium ions from the resin solution with sulfuric acid, phosphoric acid or their ammonium salts can only be accomplished with dilute solutions of these acids or salts. This results in the production of large volumes of dilute resins, which are uneconomical and undesirable in industrial practice.

It has been found that an ammonium sulfate solution, of up to 40 percent w/w in water adjusted with ammonia to a pH of about 9 can be used to remove calcium ions from a phenol-aldehyde resin without unduly reducing the resin solids.

The present invention therefore provides a process for removing ions of calcium metal from an aqueous solution of a phenol-aldehyde resin. The process comprises adding to said solution a dilute alkaline solution of a solution ammonium salt having an anion which forms an insoluble salt with calcium in an amount sufficient to bring the PH of the said solution to from 5.0 (or preferably from 5.6 ) to 6.5, and subsequently raising the pH of said solution to about 7.0 by addition thereto of ammonia.

In a preferred embodiment of the process, in which the pH of the salt solution is about 9, the anion of the salt is a member of the group consisting of sulfate, phosphate and carbonate. The treatment time with the ammonium salt is from 10 to 30 minutes. THe phenol aldehyde resin may contain free formaldehyde.

The resin may be a phenol aldehyde resin such as the one consisting of 1.9 to 2.8 mols of formaldehyde per mol of phenol. The resin may also be a modified phenol formaldehyde type resin chosen from the group comprising phenol melamine formaldehyde and phenol-dicyandiamide formaldehyde resins. The final pH of the solution may be between 6.5 and 7.3 or more preferably, between 7 and 7.3.

In the parent application, the disclosure discussed difficulties encountered when using barium hydroxide and other metal hydroxides as catalysts. Similar difficulties arise when using calcium hydroxide as catalyst. When using calcium hydroxide, sulfuric acid is normally employed as the precipitant, as in the case of barium hydrate. When iron is present the use of phosphate as the precipitant may be desirable because it tends to complex the iron to reduce discoloration caused by iron. Also, the presence of phosphate has been found to improve the curing characteristics. Carbonates could also be employed and would form insoluble carbonates. The calcium hydroxide may be derived from any suitable source such as the oxide or a hydrate.

The invention is broadly applicable to the treatment of aqueous solutions of phenol-aldehyde resins in general, which contain free ions of calcium. Typical resins mol ratios used are, for example, between 1.90 mol of formaldehyde to 1 mol of phenol and 2.8 mols formaldehyde to 1 mol phenol.

A preferred group of phenolic resin solutions which may be treated by the method of the invention are those containing phenol-aldehyde resins, or modified phenol-formaldehyde resins, which contain from 1.9 to 2.8 mols of formaldehyde to one mol of phenol and which are formed by heating the phenol and formaldehyde together in the presence of an appropriate amount of calcium hydroxide under reaction conditions conventionally used for the production of an aqueous solution of such resins.

The process of the invention may be used for the treatment of solutions of resins which contain unreacted formaldehyde as well as solutions which are free from unreacted formaldehyde. Where free formaldehyde is present the ammonia which is produced during reaction of the ammonium salt with the calcium hydroxide reacts with the free formaldehyde. It has been found experimentally that free formaldehyde contributes considerably to the success of the neutralization reaction.

Ammonium salts are generally preferred for the precipitating agent as they have advantages over salts containing other cations. For example, ammonia performs a useful function by combining as above with free formaldehyde present to form hexamethylene tetramine. Hexamethylene tetramine formation contributes to the efficiency with which the resol or a resol-Vinsol blend are transformed from the aqueous suspension into a fully cured thermosetting resin. However, the use of such other materials as quaternary ammonium salt is also envisaged in the present invention.

The final pH of the resin solution is preferably at least 6.5 and more preferably between 7 and 7.3. However, solutions of higher pH may be required for specific purposes.

When using the method of the invention it is found that the free hydroxide of calcium is removed from the aqueous solution of the phenolic resin with the formation of calcium sulfate or other insoluble salt as a finely dispersed precipitate which can be allowed to remain in the product without danger of sedimentation. At the same time, it is found that there is relatively very little degradation of the phenolic resin of the kind which is encountered when using a precipitant such as sulfuric acid. The raising of the pH to a value of about 7 after precipitation of the calcium ion has been achieved, arrests any adverse effect on the molecular structure of the phenolic resins and the amount of time required to achieve precipitation of the insoluble metal salt is not so long that appreciable degradation of the phenolic resin can take place. The necessary time is usually 10–30 minutes.

It will be appreciated that the aqueous solutions of phenolic resin obtained by the method of the invention, which are substantially free from residual calcium hydroxide, can be used in conjunction with bonding materials or other additives that the are incompatible with phenolic resin solutions containing residual catalysts. It is therefore feasible to use such aqueous phenolic resin solutions in conjunction with a variety of economically and chemically desirable additives that could not conveniently be used with the phenolic resin solutions of the prior art.

It will further be appreciated that the method of the invention involves the carrying out of a buffered reaction during which the rate of formation of calcium sulfate is controlled by the evolution of ammonia which in turn can react initially with the free formaldehyde present in the aqueous resin.

The following examples are given by way of illustration and without limitation.

EXAMPLE 1

This is an example of a type of calcium catalyzed resin of which calcium ions are removed by further treatment with an ammonium sulfate solution.

| | |
|---|---|
| Calcium catalyzed resin | 2.8:1 |
| Phenol | 1 mol |
| Formaldehyde solution | 2.8 mol |
| Catalyzed with | CaO, up to 4½ percent calcium based on weight of phenol. |

Weighted quantities of phenol and formaldehyde were blended under agitation. The mol ratio was verified by means of refractive index. Reaction temperature of 100° F. was established. CaO was added over 15 minutes while allowing a linear rise in temperature from 100° to 125° F. in 60 minutes.

The temperature was maintained at 125° F. for 30 minutes. The temperature was raised from 125° to 150° F. over 30 minutes. The temperature was kept at 150° F. until a free formaldehyde level of about 4.7 percent was reached. The pH of the resin solution is up to pH 8.8. The condensation reaction was arrested by cooling.

EXAMPLE 2

This is an example of prior art removal of calcium ions.

The pH of the resin solution was adjusted by adding 30 percent sulfuric acid solution in water to pH 7.3. The resin viscosity increased to such an extent that agitation became difficult and the resin had little water tolerance. For plant operation this is undesirable.

EXAMPLE 3.

This is an example of the removal of calcium ions without control of the pH by the addition of ammonia.

The pH of the resin solution was adjusted by adding a 30 percent w/w ammonium sulfate solution in water to a pH between pH 5.6 and pH 6.8. The resin viscosity stayed during neutralization in a range of normal pumping facilities but the water tolerance decreased materially.

EXAMPLE 4.

This is an example of the removal of calcium ions in accordance with the present invention.

The pH of the resin solution was adjusted by adding a 30 percent w/w ammonium sulfate solution which has been pH adjusted to pH 9 by the addition of ammonia. The pH was allowed to go from pH 8.8 to pH 6.7. The resin solution was then adjusted to pH 7.3 with ammonia. The resin produced by removal of the calcium ions in the above described manner exhibits little viscosity change and good water tolerance.

EXAMPLE 5.

This is an example of the preparation of a glass fiber bonding material using calcium catalyzed phenol-aldehyde resin.

Seventy parts by weight of phenol-aldehyde resin solids calcium were catalyzed. A 30 percent ammonium sulfate solution was added which had been pH adjusted to pH 9 by the addition of ammonia. The pH of the resin solution was allowed to drop below pH 7. The pH was adjusted to pH 7½ to 8 with ammonia. Thirty parts by weight of urea solids were added. 0.1 percent of a coupling agent was added. The solution was diluted to the required solids with water.

The resulting glass fiber binder is found to be of good stability and has very satisfactory curing and binding characteristics.

WHAT IS CLAIMED IS:

1. A process for removing ions of calcium metal from an aqueous solution of a calcium catalyzed phenol-aldehyde resin, comprising adding to said solution a dilute alkaline solution of a soluble ammonium salt having an anion which forms an insoluble salt with calcium in an amount sufficient to bring the pH of the said solution to from 5.0 to 6.5, and subsequently raising the pH of said solution to about 7.0 by addition thereto of ammonia.

2. A process according to claim 1, in which the pH of the dilute alkaline ammonium salt solution is about 9 and in which the anion of the salt is a member of the group consisting of sulfate, phosphate and carbonate.

3. A process as in claim 1 in which the treatment time with ammonium salt is from 10 to 30 minutes.

4. A process as in claim 1 in which the phenol aldehyde resin contains free formaldehyde.

5. A process as in claim 1 in which the resin is a phenol aldehyde resin having a mol ratio in the range of 1.9 to 2.8 mols of formaldehyde to 1 mol of phenol.

6. A process as in claim 1 in which the resin is a modified phenol formaldehyde type resin chosen from the group consisting of phenol melamine formaldehyde and phenol-dicyandiamide formaldehyde resins.

7. A process as in claim 1 in which the final pH of the solution is between 6.5 and 7.3.

8. A process as in claim 1 in which the final pH of the solution is between 7 and 7.3.

9. A process according to claim 1 wherein the dilute ammonium salt solution is rendered alkaline by the addition thereto of ammonia.

10. A process according to claim 2 in which the pH of the dilute ammonium salt solution is raised to about 9 by the addition thereto of ammonia.

* * * * *

PO-1050
(5/69)

UNITED STATES PATENT OFFICE
CERTIFICATE OF CORRECTION

Patent No. 3,624,247          Dated November 30, 1971

Inventor(s) Kurt Paul GLADNEY and Hendrik H. J. DEUZEMAN

It is certified that error appears in the above-identified patent and that said Letters Patent are hereby corrected as shown below:

Column 2, line 71, correct the spelling of "Weighed".

Column 3, line 41, after "solids" insert --were--.

Column 3, line 42, after "calcium" delete "were".

Signed and sealed this 8th day of August 1972.

(SEAL)
Attest:

EDWARD M. FLETCHER, JR.          ROBERT GOTTSCHALK
Attesting Officer                Commissioner of Patents